Patented July 1, 1930

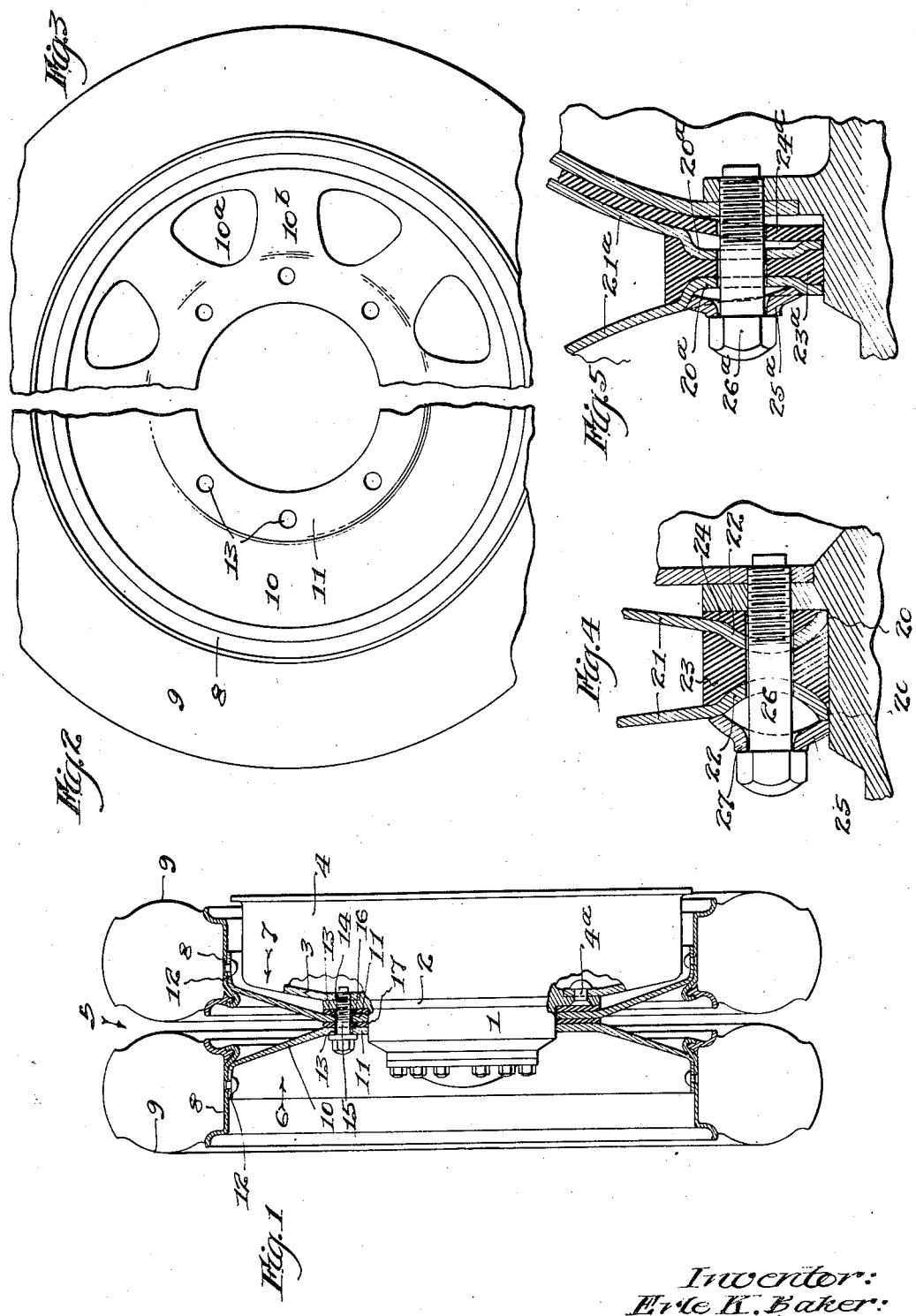

1,769,903

UNITED STATES PATENT OFFICE

ERLE K. BAKER, OF CHICAGO, ILLINOIS, ASSIGNOR, BY MESNE ASSIGNMENTS, TO MOTOR WHEEL CORPORATION, OF LANSING, MICHIGAN, A CORPORATION OF MICHIGAN

DUAL-WHEEL MOUNTING

Application filed September 6, 1927. Serial No. 217,547.

This invention relates to improvements in dual wheel mountings and it consists of the matters hereinafter described and more particularly pointed out in the appended claims.

The primary object of the invention is to provide a novel and improved mounting for the wheel members of a dual wheel upon the associated hub of a motor vehicle such as a truck, bus or other heavy duty vehicle of this kind, wherein a resilient driving engagement or connection is had between the adjacent parts of the wheel members and between one of said wheel members and the hub back flange, thus reducing the shearing tendency on the usual wheel attaching bolts to a minimum.

A further object of the invention is to provide such a mounting wherein no direct engagement is had between the wheel members themselves or between each of said wheel members and the hub back flange, so that there is no transmission of noise between the several parts, whereby a quiet running wheel structure of this kind is produced.

These objects of the invention as well as others, together with the many advantages thereof will more fully appear as I proceed with my specification.

In the drawing:—

Fig. 1 is a vertical sectional view through a dual wheel mounting embodying my invention.

Fig. 2 is a fragmentary view in elevation of one of the wheel bodies embodied in the improved dual wheel mounting.

Fig. 3 is a view similar to Fig. 2 of another form of wheel body which may be advantageously employed in my improved dual wheel mounting.

Fig. 4 is a detail sectional view through one modified form of mounting; and

Fig. 5 is a view similar to Fig. 4 through another modified form of mounting.

Referring now in detail to that embodiment of the invention illustrated in Fig. 1 of the drawing, 1 indicates as a whole, the hub barrel of a heavy duty motor vehicle, having a radial back flange 2 to the rear side of which the front wall 3 of a brake drum 4 is fixed as by the rivets 4ª shown in Fig. 1.

The dual or double wheel of such a vehicle is indicated as a whole at 5 and comprises inner and outer spaced wheel members 6 and 7 respectively, each carrying a rim 8 adaptable to receive a pneumatic tire indicated at 9.

As shown herein each wheel member consists of a wheel disc 10 having a flat central portion 11 of a diameter approximating that of the back flange and an outer annular band portion 12 to support the associated rim 8. Said wheel portions 11—11 each have a central hole to loosely fit upon the hub barrel so as to be centralized with respect thereto. Each disc is inclined with respect to its axis and when the wheel members are in operative position upon a hub, they are opposed to each other so as to space the associated rims and tires apart to prevent engagement and abrasion between said tires.

The central portions of both wheel bodies have a plurality of registering holes 13—13 therein, which holes also register with threaded holes 14 in the back flange and front wall of the brake drum. Associated with each set of holes 13—13 and 14 is a bolt 15 and these bolts are adapted to secure the wheel bodies to the hub but are not relied upon as the sole means for providing the driving connection between the wheels and hub. To provide such a driving connection I employ members 16 and 17 respectively which are to a certain extent compressible, between the inner wheel body and back flange and also between the inner and outer wheel bodies. As shown in Fig. 1 these members are discs or rings of resilient material provided with suitable holes registering with the holes 13 and 14 for the bolts 15. When said bolts are drawn up tight the disc 16 gives a full face resilient driving contact, or engagement, between the back flange and inner wheel body and the disc 17 gives a full face resilient driving contact or engagement between the inner and outer wheel bodies; said discs removing the driving strain from the bolts. Again such discs being compressed to some extent, prevent the entrance of water between the wheels and back flange so that no rusting may take place and said discs also act to absorb such sounds or noise as is produced when the wheel as a whole is travelling over rough or uneven roadways.

As before mentioned the bodies of the wheels shown in Fig. 1 are of the disc type and such a body is illustrated in elevation in Fig. 2 or the body may have openings 10ᵃ therein to simulate spokes 10ᵇ and such a body is shown in Fig. 3. This last mentioned type of wheel body is advantageous in that it permits ventilation through the wheel to dissipate the heat generated in the brake drum when the brakes are actuated at comparatively short intervals as when employed in passenger busses. Again the inner wheel may be of the form shown in Fig. 3 and the outer wheel may be of the form shown in Fig. 2.

In Fig. 4 is illustrated a slightly modified form of wheel construction wherein the central portion 20—20 of the wheel bodies 21—21 about the hub barrel hole are depressed annularly as at 22—22 on the bolt circle and these parts are faced away from each other. In this instance I provide two driving rings 23—24 of such cross sectional contour as to snugly fit against adjacent wheel body and back flange parts and a convexed ring 25 is employed in connection with the portion 22 of the outer wheel body through which the attaching bolts 26 pass. In said ring about each bolt opening is an outwardly extending boss 27 to provide a seat for the head of the bolt. When said bolt is drawn up tight to provide that engagement between the back flange, wheel bodies and friction rings necessary for the resilient drive between said parts the ring 25 also acts in the fashion of a cup washer to prevent loosening of said bolts.

In Fig. 5 is shown a further modified form of wheel wherein the central portions of the wheel bodies 21ᵃ—21ᵃ are provided with a plurality of inwardly and opposed apertured embossments 20ᵃ—20ᵃ and with resilient driving rings 23ᵃ—24ᵃ, the ring between the inner wheel body and brake drum wall and back flange being of a diameter greater than that of the other ring. In this case as before the bolt 26ᵃ passes through the several parts and a cup washer 25ᵃ is interposed between the head of the bolt and the embossments in the outer wheel body.

In all of the constructions described, a clearance is left between the shank of the bolt and wheel bodies and resilient rings so that said bolts in no way act as drivers except in their function of drawing the parts together in that relation required to give the resilient driving connection between the parts described. In this manner much labor and material are saved in a wheel structure and the annoyance of sheared or otherwise damaged bolts is eliminated as well as the noise such as is found in dual wheels as now made.

While in describing my invention I have referred in detail to the form and arrangement of the parts thereof, the same is to be considered as by way of illustration only so that I do not wish to be limited thereto except as may be pointed out in the appended claims.

I claim as my invention:—

1. A dual wheel construction embodying therein a hub having a back flange, a plurality of wheel bodies mounted on the hub, one adjacent the back flange and means providing a resilient drive between said wheel bodies and between one of said wheel bodies and the back flange.

2. A dual wheel construction embodying therein a hub having a back flange, a plurality of wheel bodies, mounted on the hub, one adjacent the back flange, resilient driving means between said wheel bodies and means for securing said wheel body adjacent the back flange to the same.

3. A dual wheel construction embodying therein a hub having a back flange, a plurality of wheel bodies mounted on the hub, one adjacent the back flange, resilient driving means between the wheel bodies and between said back flange and the wheel body adjacent the same and means for securing said parts together.

4. A dual wheel construction embodying therein a hub having a back flange, inner and outer wheel bodies, spaced from each other and with the inner body spaced from the back flange, a resilient driving member interposed between the central portions of the wheel bodies, a second resilient driving member between the central portion of the inner wheel body and the back flange and means for demountably securing the wheel bodies upon the hub.

In testimony whereof, I have hereunto set my hand, this 1st day of September, 1927.

ERLE K. BAKER.